United States Patent [19]

Ollivaud et al.

[11] Patent Number: 5,303,553
[45] Date of Patent: Apr. 19, 1994

[54] DEVICE FOR CONNECTING TUBES END-TO-END AND GAS LAUNCHER FITTED WITH SUCH DEVICES

[75] Inventors: Bernard Ollivaud, Le Cellier; Jean-Marie Lebas, Basse Goulaine, both of France

[73] Assignee: ACB, Paris, France

[21] Appl. No.: 931,967

[22] Filed: Aug. 19, 1992

[30] Foreign Application Priority Data

Aug. 20, 1991 [FR] France ................ 91 10448

[51] Int. Cl.$^5$ ............ F16L 15/00; F41F 1/00
[52] U.S. Cl. ............................ 60/632; 89/8; 285/357; 285/920; 285/18
[58] Field of Search ............. 60/632; 285/920, 357, 285/355, 390, 175, 18; 89/7, 8

[56] References Cited

U.S. PATENT DOCUMENTS

| | | | |
|---|---|---|---|
| 503,433 | 8/1893 | McIntyre | 285/357 |
| 1,538,395 | 5/1925 | Gane | 285/357 |
| 2,882,796 | 4/1959 | Clark et al. | 89/8 |
| 3,442,536 | 5/1969 | Fowler . | |
| 3,913,949 | 10/1975 | Senatro | 285/357 |
| 3,994,516 | 11/1976 | Fredd . | |
| 4,185,856 | 1/1980 | McCaskill | 285/920 |
| 4,658,699 | 4/1987 | Dahm | 102/440 |
| 4,717,183 | 1/1988 | Nobileau | 285/355 |

FOREIGN PATENT DOCUMENTS

| | | |
|---|---|---|
| 0368795 | 5/1990 | European Pat. Off. . |
| 25168 | 7/1972 | Japan ............... 285/175 |
| 718976 | 12/1951 | United Kingdom . |

OTHER PUBLICATIONS

Armendt et al., "Hypervelocity Guns", Nov. 1962, pp. 17-19.
Kimura et al., "Two-Stage Hypersonic Gun Tunnel of Kobe University" Mar. 1973, pp. 221-233.

Primary Examiner—Edward K. Look
Assistant Examiner—James A. Larson
Attorney, Agent, or Firm—Sughrue, Mion, Zinn, Macpeak & Seas

[57] ABSTRACT

A device for connecting two tubes end-to-end. At least one of the tubes is movable longitudinally to be connected to the other tube. A screwthreaded nut joins the two tubes. The first tube has at its end an outside screwthread of diameter d1 and pitch p1. The second tube has at its end an inside screwthread of diameter d2 greater than d1 and pitch p2 different than that p1 of the first tube. One of the screwthreads is continuous and the other is discontinuous by virtue of longitudinal lands subtending an angle at the center of the tube equal to that of the screwthreaded longitudinal lands. The nut 3 has an inside first screwthread compatible with that of the first tube and an outside second screwthread compatible with that of the second tube. The device further includes a system for immobilizing the tubes against rotation and a system for rotating the nut.

16 Claims, 4 Drawing Sheets

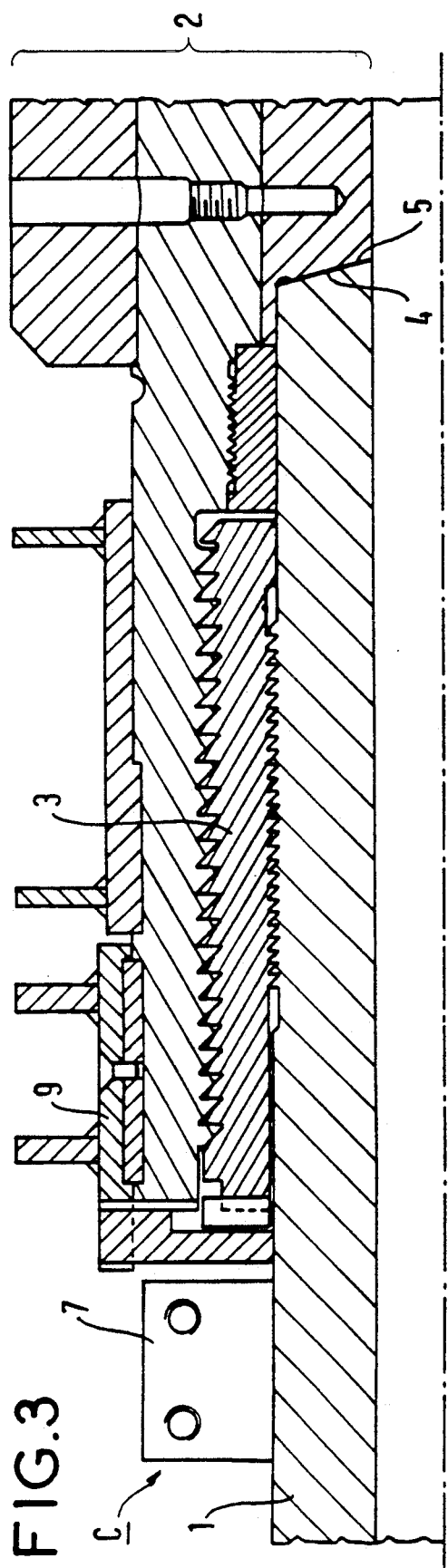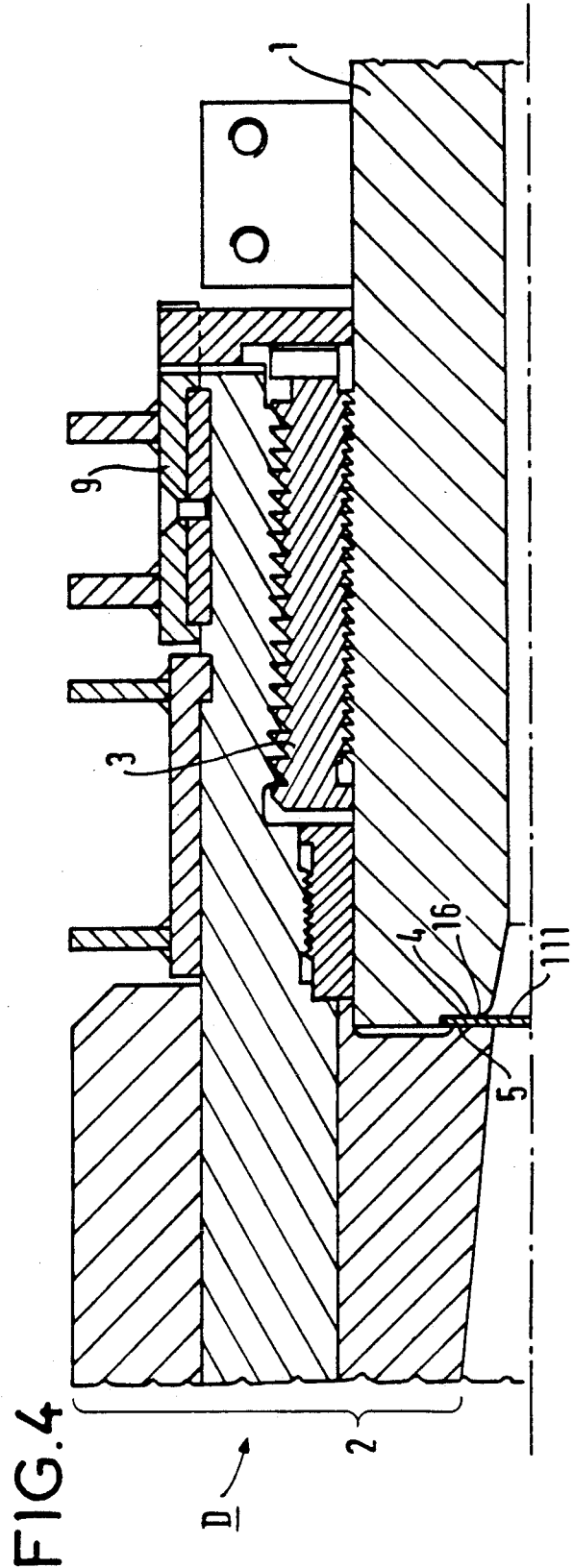

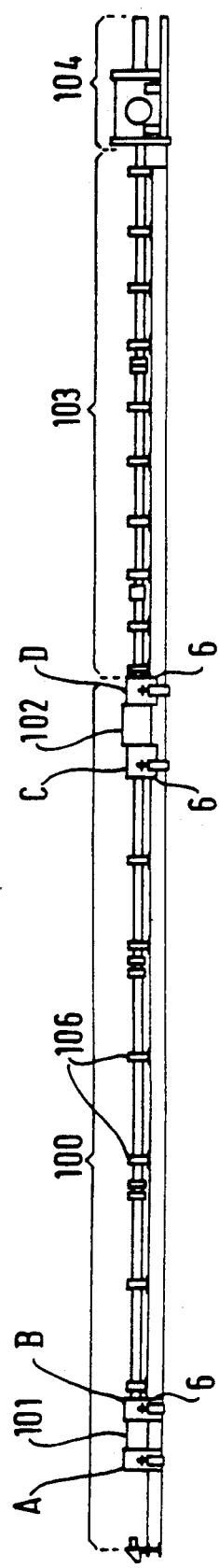
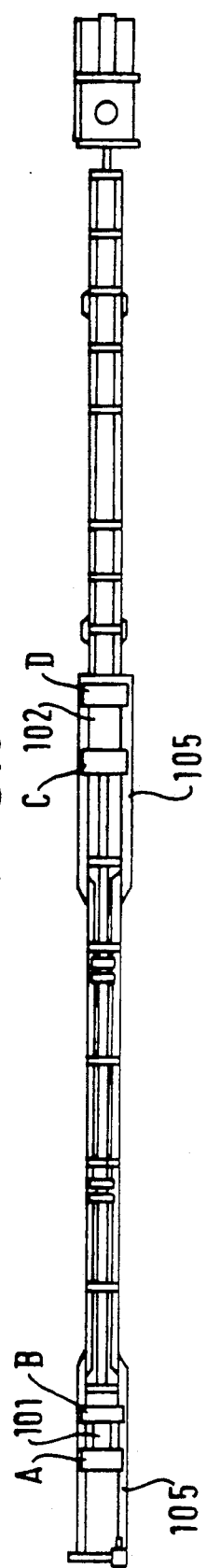
FIG.5
FIG.6

DEVICE FOR CONNECTING TUBES END-TO-END AND GAS LAUNCHER FITTED WITH SUCH DEVICES

BACKGROUND OF THE INVENTION

1. Field of the invention

The present invention concerns a device for connecting two tubes end-to-end, at least one of the tubes being moved longitudinally to connect it to the other, the device comprising a threaded nut linking the two tubes.

2. Description of the prior art

To be more precise the invention is directed to connecting tubes to be filled with pressurized gas or other product and may be fitted to tubes which are difficult to move such as large tubes.

The use of such devices is generally complicated and time-consuming.

The device in accordance with the invention provides a particularly quick connection. It enables sealed connection of tube ends by virtue of a particularly effective clamping action.

Its use requires only the longitudinal displacement of one tube.

This connection device is additionally easy to automate.

SUMMARY OF THE INVENTION

The invention consists in a device for connecting two tubes end-to-end, at least one of said tubes being movable longitudinally to be connected to the other, said device comprising a screwthreaded nut joining the two tubes and wherein:

the first tube has at its end an exterior screwthread of diameter d1 and pitch p1, the second tube has at its end an interior thread of diameter d2 greater than the diameter d1 and pitch p2 different than that p1 of the first tube, one of the threads being continuous and the other interrupted by longitudinal lands subtending an angle at the center equal to that of the threaded longitudinal lands, the nut comprises an interior first thread compatible with that of the first member and an exterior second thread compatible with that of the second member, the device further comprising means for immobilizing the tubes against rotation and means for rotating the nut.

To obtain a particularly well sealed connection the front end of the first tube is preferably abutted against the wall of the second tube.

The clamping effect is achieved by virtue of the different threads and the pitch p1 of the outside thread on the first tube is preferably less than the pitch p2 of the inside thread on the second tube.

In a preferred embodiment the means for immobilizing the second tube against rotation comprise a support frame movable in translation and in this case the means for immobilizing the first tube against rotation may comprise a ring surrounding this tube and comprising a nesting member cooperating with the support frame for the second tube when the two tubes are in the end-to-end position.

In a preferred embodiment the means for rotating the nut are fastened to the second tube.

In this case, these means may comprise a flange freely rotatable at the end of the second tube and nesting with the nut when the two tubes are in the end-to-end position and the flange may be rotated by at least one jack fastened to the second tube.

A device of this kind may be used to connect cylindrical containers or tubes containing a pressurized gas, for example to close autoclaves.

A preferred application concerns the adaptation of gas launchers in order to facilitate loading and unloading such launchers.

A gas launcher comprises at least one compression system with a combustion chamber and a high-pressure chamber and a launch system. It may be used to test models.

A launcher is usually made up of tube sections fastened together in a fixed way.

The tube of the compression system is filled with a gas such as hydrogen which is compressed by igniting the powder and displacement of a piston in the combustion chamber. A rupture membrane and a piston arrester cone are disposed in the high-pressure chamber.

Removing the piston from the arrester cone requires moving it towards the upstream end of the launcher as far as the combustion chamber, the distance between the combustion and high-pressure chambers possibly being as much as 30 meters.

The invention renders the two chambers disconnectable from the compression and launch tube systems and as a result the piston can be easily loaded into the first chamber and unloaded from the second chamber.

To be more precise, the combustion and high-pressure chambers are disconnectable, the compression system is movable longitudinally and the combustion and high-pressure chambers are connected by devices as previously described.

The invention is described in more detail below with reference to drawings showing one embodiment.

BRIEF DESCRIPTION OF THE DRAWINGS

FIGS. 3 and 4 are partial views in cross-section of second and third embodiments of the connecting device.

FIG. 5 is a side view of a gas launcher in accordance with the invention.

FIG. 6 is a top view of this gas launcher.

DETAILED DESCRIPTION OF THE INVENTION

Figure 1:
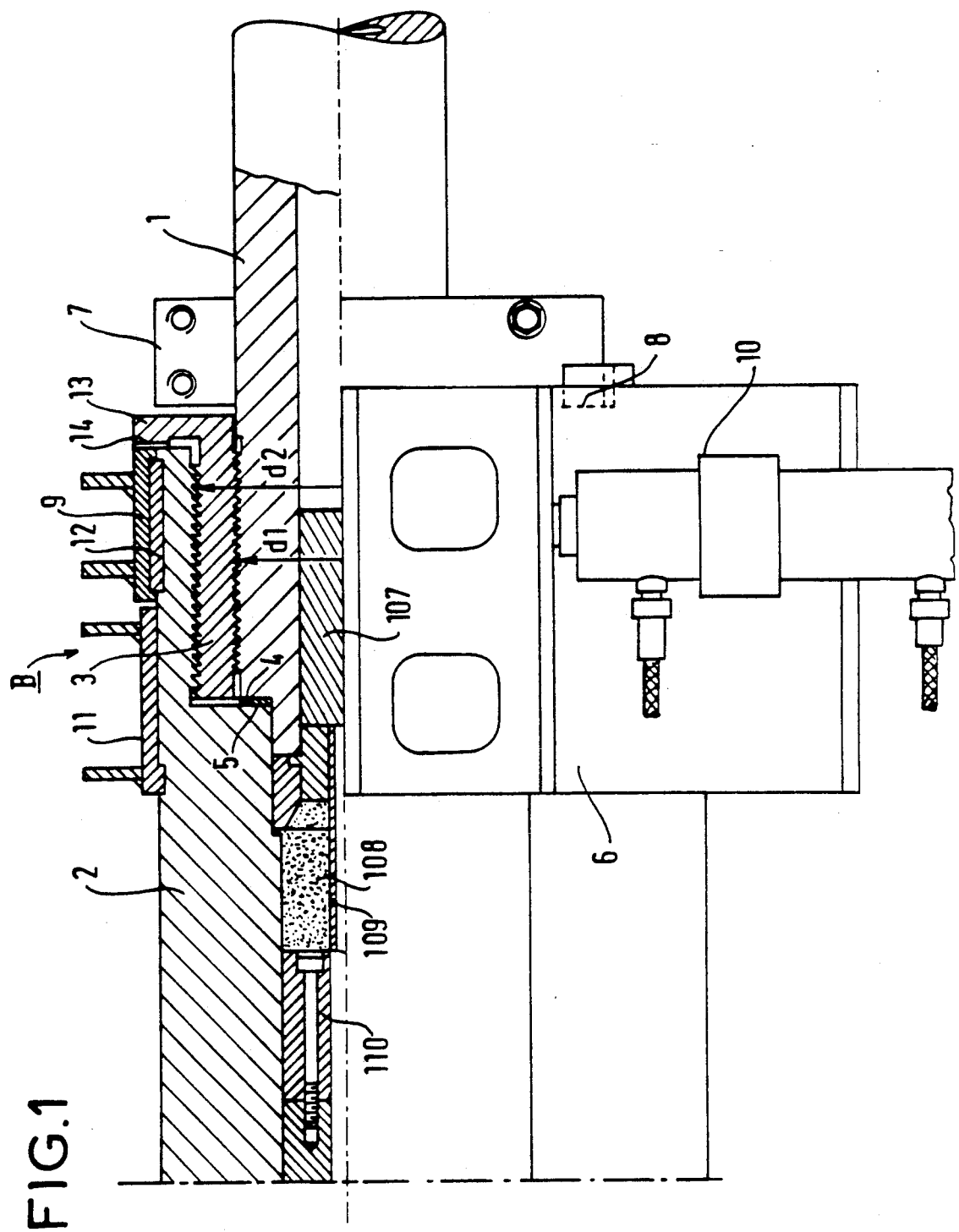
FIG. 1 is a side view of a connection device in accordance with a first embodiment of the invention.
Figure 2:
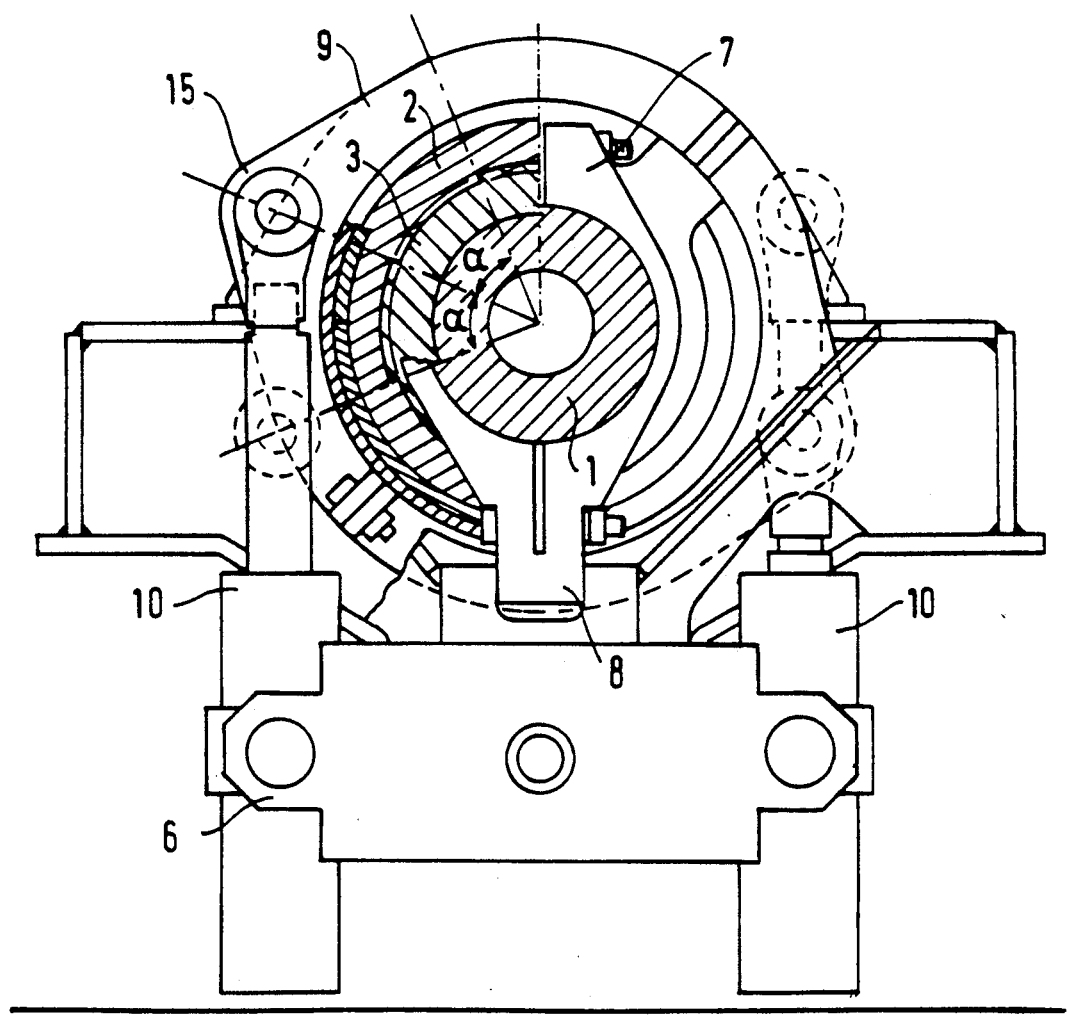
FIG. 2 is a front view of this device.

The connecting device in accordance with the invention is described first with reference to the embodiment of FIGS. 1 and 2.

The first tube 1 has at its end an outside screwthread of diameter d1 and pitch p1.

The second tube 2 to be connected to the first has at its end an inside screwthread of diameter d2 and pitch p2.

This thread is on a shoulder of the second tube 2 and d2 is greater than d1.

A nut 3 is inserted between the ends of the two tubes 1 and 2.

This nut has an inside diameter equal to d1 and an outside diameter equal to d2. It has an inside first screwthread cooperating with the screwthread of the first tube 1 and an outside second screwthread cooperating with the screwthread of the second tube 2.

By means of a part 11 embedded in the tube 2 the latter is fastened to a support frame 6 movable in the longitudinal direction of the tubes 1 and 2.

A split ring 7 surrounds the first tube 1 and when bolted to the latter can be immobilized against rotation relative to the frame 6 by a nesting member 8 cooperating with a notch on the frame 6 when the two tubes 1, 2 are abutted end-to-end.

This immobilizes the tubes 1 and 2 against rotation.

The end of the second tube 2 also carries a flange 9 freely rotatable on but prevented from movement in translation on the tube 2 by a half-shell 12 made from bronze or the like.

The nut 3 has an integral front flange 13 which nests at 14 within the flange 9 when the tubes 1 and 2 are abutted end-to-end.

Two jacks 10 are fixed to the frame 6 and their piston rods are joined to lugs 15 of the flange 9. Operating the jacks 10 rotates the flange 9 which rotates the nut 3.

The tubes 1 and 2 are connected by moving the tube 2 longitudinally towards the tube 1.

To achieve this the nut 3 remains mounted on the tube 1.

The outside screwthread on the tube 1 and the inside first screwthread on the nut 3 are compatible, continuous and of pitch p1.

The inside screwthread on the tube 2 and the outside second screwthread on the nut 3 are compatible, discontinuous and of pitch p2. To be more precise, they are interrupted by longitudinal lands subtending an angle at the center of the tube 1 equal to that of the threaded longitudinal lands. These screwthreads are preferably interrupted at regular angles α of 45° C., FIG. 2.

The discontinuous threads can therefore be nested one within the other by movement in longitudinal translation and locked together by rotation of the nut 3.

The pitches p1 and p2 of the inside and outside screwthreads on the nut 3 are different, p2 being twice p1, for example.

This system of different screwthreads achieves effective clamping of the butted tubes.

This clamping is achieved by abutting engagement of the front surfaces 4, 5 of the tubes, 1, 2, respectively, FIG. 1.

Referring to FIG. 1, these surfaces 4, 5 are obtained by machining radial shoulders on the first tube 1 and the second tube 2.

The turns of the discontinuous screwthreads in practice overlap by a rotation of around 30° and clamping is achieved over a range less than 15°.

FIGS. 3 and 4 show two other embodiments of the invention, with abutment surfaces 4 and 5.

In FIG. 3 these surfaces 4, 5 are frustoconical.

In FIG. 4 a clearance 16 is provided between these two radial surfaces, a member 111 being immobilizable between the two butted tubes 1 and 2.

A gas launcher with disconnectable chambers can be implemented using the device described above.

FIGS. 5 and 6 show a launcher of this kind.

It comprises at least a compression system 100, a launch system 103 and a detent system 104.

A combustion chamber 101 is provided on the upstream side of the compression system 100 and a high-pressure chamber 102 on its downstream side. The launch system 103 may be moved laterally on air cushions.

In a launcher of this kind the compression system 100 may be around 30 meters long and the launch system 103 around 20 meters long.

The compression system 100 may be moved longitudinally, the support frames 6 at the ends of the chambers 101, 102 being movable on rails 105 and the tubes guided in supports 106.

The chambers 101, 102 are provided with connecting devices B, C, D as previously described. The upstream end of the compression system 100 is closed by a device A known in itself.

Access to the chambers 101, 102 is obtained by disconnecting the device D, moving the compression system 100 and then disconnecting the devices A, B and C. This facilitates offloading the piston from the high-pressure chamber 102 after launch and loading the piston into the combustion chamber 101 before launch.

FIG. 1 is a partial view of a combustion chamber 101 of this kind fitted with the device B. The piston 107 is placed at the downstream end of the chamber, powder is placed in a space 108 further upstream and the volume of the ignited tube 109 is adjusted by means of filler blocks 110.

On ignition, the piston 107 compresses the hydrogen filling the tube of the compression system 100.

Part of the device C is shown in FIG. 3 and the device D is shown in FIG. 4.

The latter figure shows part of the rupture disk 111 disposed on the downstream side of the high-pressure chamber 102.

This is a membrane which ruptures at a pressure of about 10 000 bars and which is retained by the connecting device D.

The pressure of the hydrogen can be as high as about 15 000 bars and conventional seals are provided at the connections.

By virtue of the invention, the piston 107 is easily recoverable from an arrester cone in the high-pressure chamber 102.

The operations may be automated by hydraulic actuation of the jacks 10 and automatic displacement by means of horizontal jacks.

There is claimed:

1. Device for connecting first and second tubes end-to-end, at least one of said tubes being movable longitudinally to be connected to the other, said device comprising a screwthreaded nut joining the two tubes and wherein:

the first tube has at an end thereof, an outside screwthread of diameter d1 and pitch p1.

the second tube has at an end thereof, an inside screwthread of diameter d2 greater than d1 and pitch p2 different than that p1 of said first tube, one of said inside and outside screwthreads being continuous and the other screwthread discontinuous by virtue of longitudinal lands subtending an angle at the center of the tube equal to that of the screwthreaded longitudinal lands, said nut comprises an inside first screwthread compatible with the outside screwthread of the first tube and an outside second screwthread compatible with the inside screwthread of the second tube, and said device further comprising means for immobilizing said tubes against rotation, and means for rotating said nut.

2. Device according to claim 1 wherein the front end of the first tube is abutted against a wall of the second tube.

3. Device according to claim 1 wherein the pitch p1 of said outside thread of said first tube is less than the pitch p2 of said inside thread of said second tube.

4. Device according to claim 1 wherein said means for immobilizing said second tube against rotation comprise a support frame adapted to move in translation.

5. Device according to claim 4 wherein said means for immobilizing said first tube against rotation comprise a ring surrounding said first tube and comprising a nesting member cooperating with said support frame of said second tube in the end-to-end position of said tubes.

6. Device according to claim 1 wherein said means for rotating said nut are fastened to said second tube.

7. Device according to claim 6 wherein said means for rotating said nut comprise a flange freely rotatable at the end of said second tube and nesting with said nut in the end-to-end position of said tubes.

8. Device according to claim 7 characterized in that said flange is rotated by at least one jack fastened to said second tube.

9. Gas launcher comprising at least a compression system with a combustion chamber and a high-pressure chamber and a launch system wherein said combustion and high-pressure chambers are disconnectable, said compression system is movable longitudinally and said combustion and high-pressure chambers are connected by a device for connecting first and second tubes end-to-end, at least one of said tubes being movable longitudinally to be connected to the other, said device comprising a screwthreaded nut joining the two tubes and wherein:

the first tube has at an end thereof, an outside screwthread of diameter d1 and pitch p1, the second tube has at an end thereof, an inside screwthread of diameter d2 greater than d1 and pitch p2 different than that p1 of said first tube, one of said inside and outside screwthreads being continuous and the other screwthread discontinuous by virtue of longitudinal lands subtending an angle at the center of the tube equal to that of the screwthreaded longitudinal lands, said nut comprises an inside first screwthread compatible with the outside screwthread of the first tube and an outside second screwthread compatible with the inside screwthread of the second tube, and said device further comprising means for immobilizing said tubes against rotation and means for rotating said nut.

10. Launcher according to claim 9 wherein the front end of the first tube is abutted against a wall of the second tube.

11. Device according to claim 9 wherein the pitch p1 of said outside thread of said first tube is less than the pitch p2 of said inside thread of said second tube.

12. Device according to claim 9 wherein said means for immobilizing said second tube against rotation comprise a support frame adapted to move in translation.

13. Device according to claim 12 wherein said means for immobilizing said first tube against rotation comprise a ring surrounding said first tube and comprising a nesting member cooperating with said support frame of said second tube in the end-to-end position of said tubes.

14. Device according to claim 9 wherein said means for rotating said nut are fastened to said second tube.

15. Device according to claim 14 wherein said means for rotating said nut comprise a flange freely rotatable at the end of said second tube and nesting with said nut in the end-to-end position of said tubes.

16. Device according to claim 15 characterized in that said flange is rotated by at least one jack fastened to said second tube.

* * * * *